Jan. 30, 1945.  W. T. HANKE  2,368,297
UTENSIL HANDLE
Filed June 21, 1944
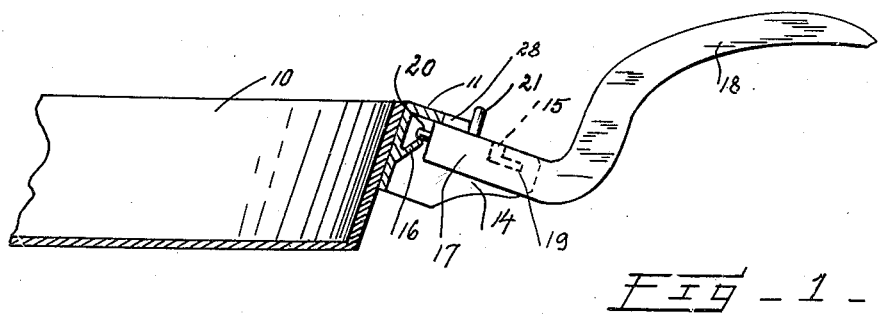
Fig - 1 -
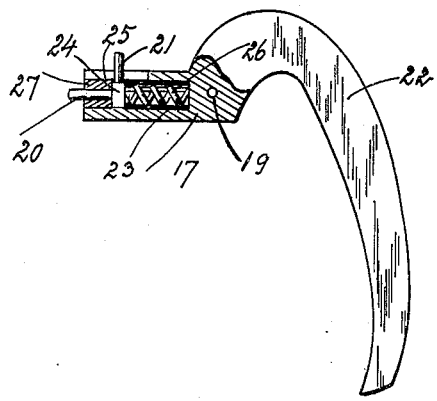
Fig - 2 -
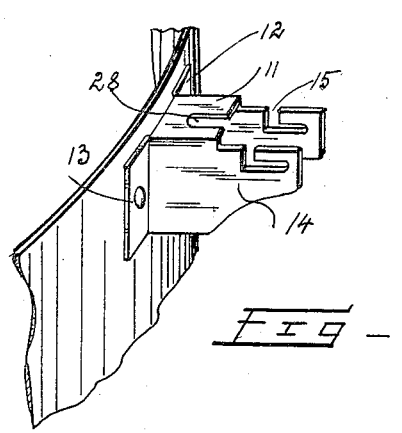
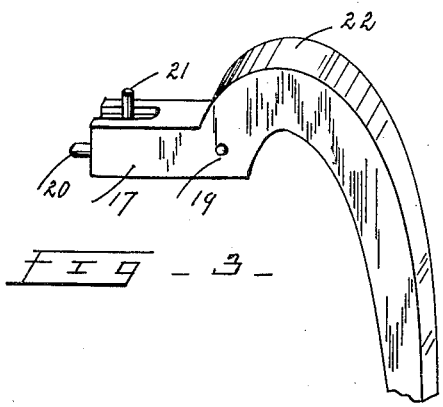
Fig - 3 -
Fig - 4 -
INVENTOR.
William T. Hanke.
BY
Louis Chayka
Attorney Patented Jan. 30, 1945

2,368,297

UNITED STATES PATENT OFFICE 2,368,297

UTENSIL HANDLE

William T. Hanke, Detroit, Mich.

Application June 21, 1944, Serial No. 541,363

2 Claims. (Cl. 16—114)

The purpose of my improvement is to provide a removable handle which is to be used in conjunction with a suitable socket attached to the side of a utensil, such as a pot, a pan, a percolator, and so forth.

A specific purpose is to provide a handle which calls for a socket of very simple construction and which in itself is very simple.

Another purpose is to provide such a combination of the socket and the handle as to eliminate all springs from the socket, in view of the fact that utensils to which my handle may be applied, may be exposed to relatively high temperatures which in time would destroy the usefulness of the springs.

I shall now describe my invention with reference to the accompanying drawing, in which:

Fig. 1 is a fragmentary sectional view of a utensil to which my handle may be applied, including a sectional view of the socket for the reception of my handle and a side elevation of the handle fitted into said socket.

Fig. 2 is a side elevation of my handle, with a sectional view of the shank adapted to enter the socket shown in Fig. 1.

Fig. 3 is a slightly enlarged perspective view of my handle.

Fig. 4 is a slightly enlarged perspective view of a socket affixed to a utensil, which is shown in fragment.

Similar numerals refer to similar parts throughout the several views.

The socket which is affixed to the side of utensil 10 consists of a transverse bridge 11 with an elongated central aperture 28, two wings 13 perforated for the reception of bolts 26, and two spaced arms 14 extending substantially radially from said utensil 10. Each arm 14 has a slot 15 leading from its upper edge, first perpendicularly down then horizontally away from the utensil.

Jutting out from the inner wall of the socket is a short arm 16. The handle 18, which is adapted to fit into said socket, includes a shank 17, provided with pins 19 on each side thereof. Said shank is provided with an inner bore 23 and contains therein a coiled spring 26 bearing against a sliding block 24, the latter serving as a base for a pin 21 extending upwardly through a slot 25 in the shank of said handle. Affixed to said block 24 on the side opposite to that of spring 26, is a bolt 20 disposed slidingly in bearing 27. Normally, under the action of said spring 26, said bolt 20 will project outwardly from said shank, as shown in Fig. 2.

Normally, when the handle is in its operative position within said socket, bolt 20 juts over said arm 16, while pins 19 are retained within slots 15. When the handle is in this position, it is impossible to rock it or to remove it, and the operative engagement between the handle and the socket is firm and positive.

Should it be necessary to remove the handle, all that must be done is to shift the pin 21 from its position shown in Fig. 1 in the direction of slot 15, that is, away from the utensil. This will shift bolt 20 from its engagement with arm 16, whereupon the handle may be swung upwardly on pins 19 acting as pivots, so that shank 17 of the handle will pass downwardly between said arms 14, and pin 21 will pass through aperture 28. Said bolt 20 being so disengaged from arm 16, all that is necessary is to push the handle in the direction of the utensil along the horizontal part of slot 15, in order that said pin 19 may be removed through the substantially upright part of said slot.

When it is intended to insert the handle into said socket the operation that is necessary to accomplish this, is obvious. The handle is held so that the shank is in a substantially perpendicular position and pin 19 fits into slot 15. Then, while said pin acts as a pivot, handle 18 is swung downwardly until bolt 20, bearing against the under surface of arm 16, passes the end of said arm and is free to extend outwardly under the opertion of spring 26 over the end of said arm 16, as shown in Fig. 1.

It will be understood that some changes may be made in the construction of my handle and socket combination without departing from the inventive principle disclosed herein. What I, therefore, wish to claim is as follows:

1. In combination, a socket on a utensil comprising a base, two spaced arms extending therefrom, each arm having a horizontal slot opening upwardly, a bridge between the arms, adjoining the base, an angular member extending from the base upwardly, and a handle including a shank to fit into the socket between the arms and under the bridge, a transversely extending pin on each side of the shank to fit into a respective slot, a slidable bolt axially disposed in the end of the shank and normally jutting over the upper end of said angular member, a spring urging said bolt outwardly and a pin rising upwardly out of the shank for manual operation of the bolt against the tension of said spring.

2. In combination, a socket on a utensil comprising a base affixed to said utensil, and having two spaced arms each provided with a horizontal slot opening upwardly, a transverse bridge joining the arms between the base and the slots, an angular member extending from the base upwardly, a removable handle having a shank the end of which fits into the socket under said bridge, a transverse pin on each side of the shank to fit into a respective slot, an axially disposed bolt in the end of the shank, a spring on the inner side of the bolt, urging it outwardly out of the shank and over said angular member, and manually operated means on the shank to retract the bolt against the tension of the spring.

WILLIAM T. HANKE.